Nov. 2, 1965  C. CHANDLER  3,215,008
POWERED EDGE-SHAPING TOOLS
Filed Aug. 16, 1963  2 Sheets-Sheet 1

INVENTOR
CLARK CHANDLER, DEC'D.
by LOYD C. HILTON, JR., EXECUTOR
BY
ATTORNEY

Nov. 2, 1965   C. CHANDLER   3,215,008
POWERED EDGE-SHAPING TOOLS
Filed Aug. 16, 1963   2 Sheets-Sheet 2
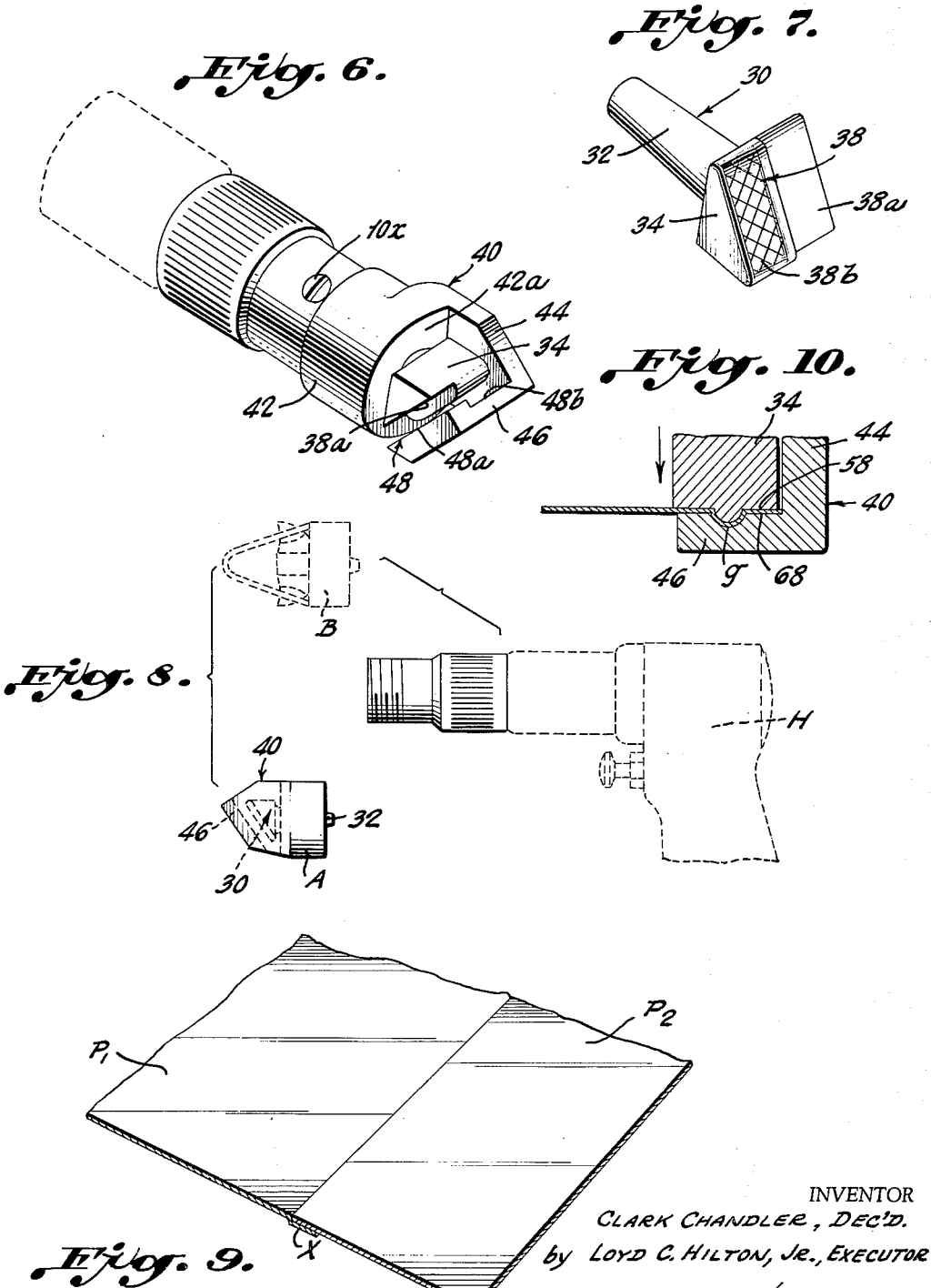
INVENTOR
CLARK CHANDLER, DEC'D.
by LOYD C. HILTON, JR., EXECUTOR
BY
ATTORNEY

United States Patent Office 3,215,008
Patented Nov. 2, 1965

3,215,008
POWERED EDGE-SHAPING TOOLS
Clark Chandler, deceased, late of Panama City, Fla., by Loyd C. Hilton, Jr., executor, Bay County, Fla.
Filed Aug. 16, 1963, Ser. No. 302,746
6 Claims. (Cl. 72—386)

This invention relates to improvements in powered edge-shaping tools and more particularly to an improved impactor-type tool for edge off-setting (sometimes also called "crimping") the edge portions of metal sheets, panels and the like in accordance with the various requirements therefor.

Although not limited thereto, a metal sheet or panel edge-shaping tool of the invention was designed for use in, and will be more particularly disclosed in its application to the field of automobile body repair. In explanation, if the body of an automobile has suffered damage through collision or accident or has developed rusted areas, it has been common practice to cut out the damaged or rusted sections by means, for example, of a so-called panel cutter of the type disclosed and claimed in my Patent No. 3,056,201, dated October 2, 1962, and to secure by welding or riveting a repair panel in place thereof. However, prior to the present invention, such repair procedure has not been entirely satisfactory because of the practical requirement that the repair panel must be secured in edge-overlapping (or underlapping, as the case may be) relation with respect to an edge (or edges) of the good panel, with the result that the contiguous viewable surfaces of the repair and good panels were not flush, i.e. at the same level with, one another upon final securement of the panels.

Also, the repairman attempting to weld two pieces or panels of sheet metal together along adjacent overlapping edges by the conventional procedures usually experienced substantial warpage of one or the other edges, consequent to the heat of welding and the lack of any stiffening of either one or both the overlapping-underlapping panel edges as might be effective in controlling warpage. Obviously, any such warpage is most objectionable, as it results in the formation of an unsightly seam or joint between the secured panel edges.

Considering the above and the numerous other both repair and original installations requiring the securement of metal sheets, panels, etc. along adjacent meeting edges and wherein it is desirable if not necessary that the secured-together adjacent panels have substantially surface-flush relationship, it is a primary object of the invention to provide a simple yet highly effective power tool for offsetting the edge portion of at least one of adjacent metal sheets, panels and the like which are to be related and then secured in edge-overlapping relationship, in manner to insure not only that a good joint or seam is formed upon final securement of the overlapping-underlying edges, but also that the secured sheets or panels will be finally disposed in surface-flush or surface-blended relationship with one another.

Another object of the invention is the provision of a rugged, thoroughly dependable tool of the above stated character which may be operated by being simply hooked from the side to, while being manually held from above and at a convenient angle with respect to, the edge of the metal sheet, panel or other workpiece which is to be shaped and then simply run along said edge, with assurance that the line of offsetting will be parallel to said edge.

Yet another object of the invention is the provision of a tool for so shaping the edge of a metal sheet, panel or the like which is to be welded to a contiguous metal sheet or panel as to effect substantial stiffening thereof to a degree reducing if not preventing objectionable warpage of said edge occurring from the heat of welding.

Still another object of the invention is the provision of a powered impact- or hammer-type metal sheet or panel edge-offsetting or "crimping" tool which is characterized by simple design and by rugged and durable construction, and which is moreover easy to operate and thoroughly dependable in operation.

The above and other objects and features of advantage of a powered metal sheet or panel edge-shaping or crimping tool according to the invention will appear from the following more detailed description thereof, in which reference is had to the accompanying illustrative drawings, wherein:

FIG. 6 is a perspective view of the tool shown in FIG. 2, looking into the working end of the tool head;

FIG. 7 is a perspective view of the hammer component of the working head shown separated from the latter;

FIG. 8 is a view suggesting the possibility of mounting a metal sheet or panel edging tool-head according to the invention on a basic tool adapted to be powered by a gun-type pneumatic power hammer, interchangeably with a sheet metal or panel cutting head of the general type disclosed and claimed in my aforesaid Patent No. 3,056,-201;

Figure 4:
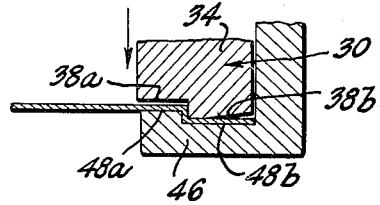

FIG. 9 is a fragmentary view showing two panels associated in surface-flush or blended relationship, as is made possible by the offsetting of one panel edge by an edge-shaping tool according to the invention; and FIG. 10 is a view similar to FIG. 4 which illustrates one of the many possible alternate profiles with which the respective working faces of the hammer and anvil of a metal-sheet or panel edging tool according to the invention may be provided.

Figure 1:
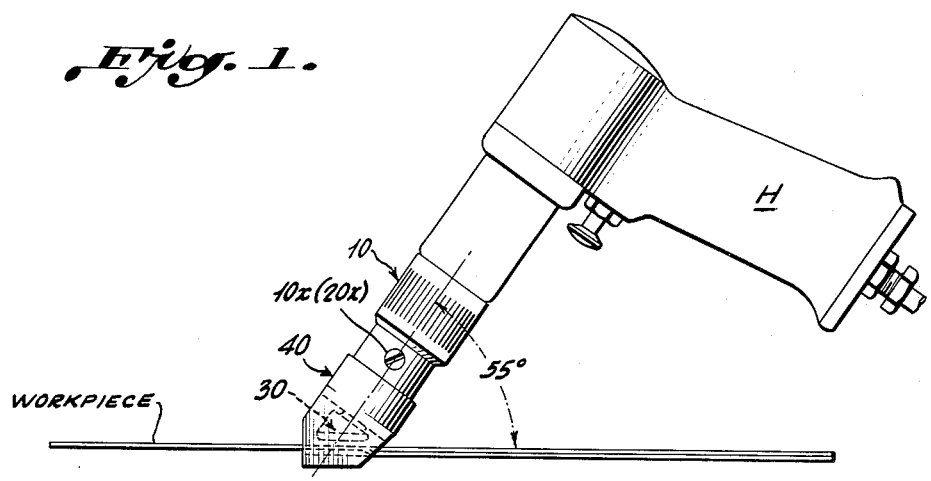
FIG. 1 is a side elevation of said tool which illustrates both its general external appearance and its positioning with respect to a workpiece in use thereof.

Referring to the drawing in greater detail, a powered metal sheet or panel edge-shaping tool as herein proposed is adapted to be drivingly associated with a power (usually pneumatic) hammer of the pistol or gun type generally designated H and to be used in the manner illustrated in FIG. 1. More particularly, a tool according to the invention comprises a tubular barrel 10 mounting in its intermediate smooth bore portion 12 (FIG. 2) a reciprocatory plunger 20 which in turn mounts a forwardly extending hammer 30 whose working end 34 projects beyond the forward end of said barrel. As will be made clear as the description proceeds, the hammer 30 constitutes a major component of a forming or edging head A (see FIG. 8), the other major component of which comprises a dolly 40 which is affixed to the forward end of the barrel 10 and incorporates at its forward or working end an anvil member generally designated 46.

Figure 2:
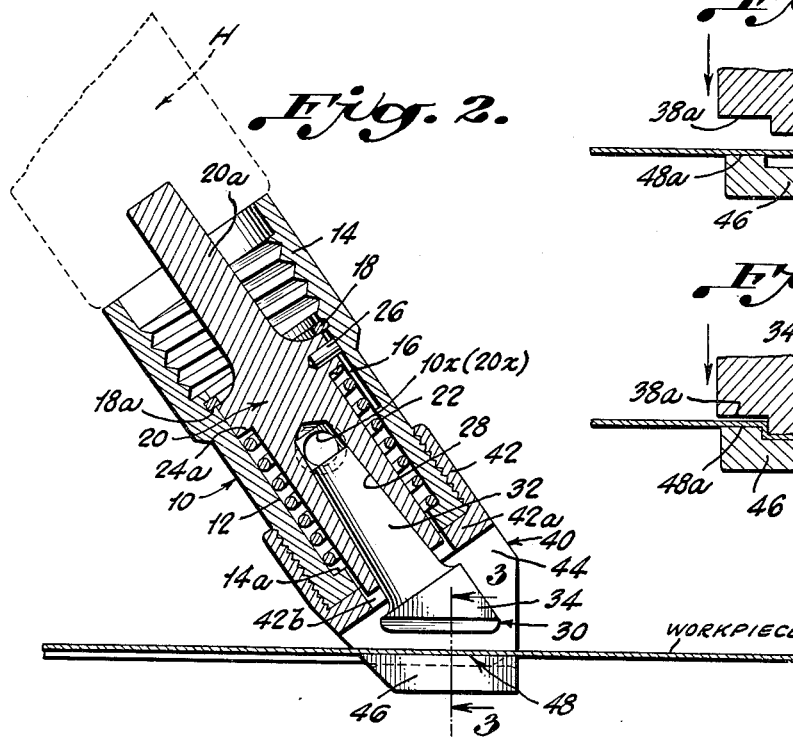
FIG. 2 is a vertical section taken through the basic tool and the attached edge-shaping tool head according to the invention, viewed from the opposite side thereof than as seen in FIG. 1.

As best seen in FIG. 2, the rearward end 14 of the bore of the barrel 10 is enlarged and is internally threaded whereby said barrel may be threadably connected to the usually externally threaded barrel portion (not shown) of the power hammer H. Preferably, the tool barrel 10 also encloses a plunger-retracting spring 22 which encircles the plunger and is reactive between a forwardly facing rear-end shoulder 24a on said plunger and a rearwardly facing front-end shoulder 14a provided in said barrel bore. Illustratively, the plunger 20 is held against rotation with respect to the tool barrel 10 by means of a plunger-mounted pin or key 26 operating in an axial keyway 16 which is machined or otherwise provided in the smooth-bore portion of said barrel. Also, the plunger 20 is held against rearward separating movement with respect to the barrel by an internal spring retaining ring 18 seated in a rear-end groove 18a opening into the barrel bore.

At its rearward end, the plunger 20 is provided with a rearwardly extending axial stem 20a which projects into the gun barrel a distance such that its end face is impacted by the percussive or impactor element (not shown) of the pneumatic hammer H.

The aforesaid hammer element 30 (FIGS. 2 and 7), which is preferably formed as a forging, comprises a tapered shank or tang 32 and extending axially therefrom, the aforesaid working end 34, of which said shank is adapted when inserted therein to seat in a forwardly opening, complementally tapered socket 28 provided therefor in the forward end of the plunger 20. By proper selection of the complemental taper of both said shank 32 and the socket 28, the hammer 30 will be securely held by friction to the plunger 20 against any and all normally occurring forces tending to separate it from the plunger. However, to provide for bodily removal of the hammer for repair or replacement thereof, the barrel 10 and plunger 20 may be provided with hammer knock-out holes 10x, 20x which register in the normal or retracted position of the plunger and are further so located axially with respect to the barrel and plunger as to be partially intersected by the rearward end of the hammer shank 32 in the secured position of the hammer. Such an arrangement permits of a simple disconnection of the hammer 30 from plunger 20 by inserting a drift pin or punch into said aligned openings 10x, 20x, and then striking same with a suitable tool, as results in the frictional grip of socket wall on tool-shank outer surface being broken.

While the aforesaid dolly 40 may be formed integral with the barrel 10, preferably it is formed separate therefrom and is detachably secured by screw threading to the forward end of the barrel. Accordingly, and again referring to FIG. 2, the forward end of the barrel is externally threaded, and the rearward or attaching end of the dolly is formed as a full-circular attaching collar 42 which is fitted to said forward end and is provided with corresponding internal threads. Illustratively, said collar portion 42 terminates in a circular end wall 42a which is centrally apertured as at 42b, thus to provide for reciprocatory movement of the forward end of the plunger 10 and attached hammer shank 32 therethrough.

Referring to FIGS. 2 and 6, the dolly 40 includes a sidewardly offset, rugged connector arm 44 integral with both the attaching collar 42 and the aforesaid anvil 46 and which serves rigidly to connect the latter to said collar and thereby to the tool barrel 10. It is observed that the sideward or offset displacement of the connector arm 48 from said collar 42 is such as to provide adequate working space for the working end 34 of the hammer 30, that both said arm and the anvil 46 have the rectangular section of a bar or plate and thus their effective working surfaces are flat or plane surfaces, and that the anvil extends at a right angle from said connector arm.

As also seen in FIGS. 2 and 7 in particular, said working end 34 of the hammer 30 consists of a relatively massive head which extends forwardly from the shank end 32 thereof and is provided with a forwardly disposed, generally plane and extends transversely across the path working face 48 of the aforesaid anvil 46, which is also generally plane and extends transversely across the path of reciprocatory travel of the hammer, is opposed so as to be struck by the hammer working face 38 as the hammer moves throughout each working stroke.

According to the invention, the aforesaid opposed working faces 38 and 48 of the hammer and anvil, respectively, are inclined forwardly-downwardly with respect to the longitudinal axis of the tool as a whole. Preferably, and as seen in FIG. 1, the angle of working face-to-tool axis is 55°, but of course this may vary somewhat. The purpose of this angling is to permit the tool to be held from above and at a comfortable angle with respect to the metal sheet or panel constituting the workpiece, as it is being run along the edge thereof to effect a desired shaping of said edge.

Figure 3:
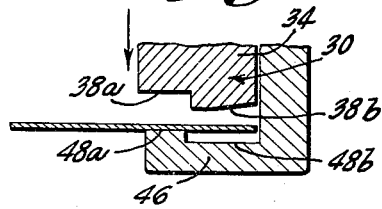
FIGS. 3 and 4 are fragmentary views, in section, which show the profile for, and the action of the opposed working faces of the components of the tool of the invention in, off-setting the edge portion of a metal sheet or panel, which latter is only partially shown.

The shape imparted to the workpiece edge of course depends on the profile of the opposed working surfaces 38, 48 of the hammer and anvil. That is to say, if it is desired to provide a running, i.e. continuous, offset in the workpiece edge, the aforesaid working faces will be profiled generally as shown in FIGS. 3 and 4. More particularly, the working face of the hammer is subdivided into two lesser width working surface portions 38a, 38b, of which the relatively inner working-surface portion 38a (so termed because it works on a portion of the sheet or panel which is disposed inwardly its edge proper) is at a somewhat higher level than the outer working-surface portion 38b, with the result that said outer working-surface portion is downwardly stepped or offset; and the opposed working surface of the anvil 46 is complementally stepped so that its relatively outer working-surface portion 48b is downwardly offset from its inner working-surface portion 48a. As will be apparent from a consideration of FIG. 4, the degree of offsetting of the hammer and anvil working surfaces is that providing the desired depth of offset to be imparted to the workpiece edge. It will further be understood that the width of the offset to be provided along the workpiece edge will determine the location of the step line between the offset working-surface portions 38, 38b of the hammer and similarly between the complementally offset working-surface portions 48a, 48b of the anvil.

In explanation of the above statements made with regard to the degree and width of the offsetting provided in the working surfaces of hammer and anvil, reference is had to FIG. 9 which is intended to illustrate two panels $P_1$ and $P_2$ connected along adjacent edges in surface-flush or -blended relationship, through the provision of offset X provided along the connected edge of panel $P_1$, in which offset the adjacent edge of panel $P_2$ seats. In such instance, the depth of the offset provided in the opposed working faces of the hammer 30 and anvil 46 will be substantially equal to the thickness of panel $P_2$ and the location of the line of offsetting provided in said working faces will be such as to yield the desired amount of overlap of the edge of panel $P_2$ with respect to the adjacent edge of panel $P_1$.

Figure 5:
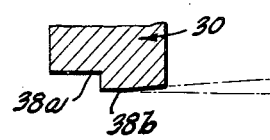
FIG. 5 is a further fragmentary view in section illustrating the relief which is preferably provided along one side edge of the working face of the aforesaid hammer component.

In connection with the 5° relief shown to be provided in the relatively outer portion 38b of the hammer 30 according to FIG. 5, such is desirable in that it provides in the final product sharp cornering between the downwardly stepped edge portion of the workpiece and the workpiece proper. This appears to result from the fact that the metal of the free edge of the workpiece acted upon by the relieved portion of the hammer working-face portion 38b is free to flow inwardly to those areas of the workpiece edge being subjected to the more direct action of the non-relieved hammer working-face portion 38a. Preferably also, the relatively lower-level working-face portion 38b of the hammer working face is knurled as indicated in FIG. 7, such knurling appearing to provide beneficial action in relieving a portion of the internal stresses developed in the metal making up the edge zone as it is being shaped.

Referring to FIG. 8, such is intended to illustrate that a metal sheet or panel edge-shaping head A constructed according to the herein invention and which, as explained above, consists of the hammer and dolly parts 30, 40, may be used interchangeably with a cutting head B of a panel cutter according to my prior Patent No. 3,056,201, assuming the latter head to be constructed as a separate screw-on head assembly, by attaching one or the other to the basic tool comprising the aforesaid barrel 10, plunger 20, and the appurtenances individual thereto. By such an arrangement, upon detachment of a edge-shaping head A therefrom, the cutting head B may be screwed on to the barrel 10 of the basic tool when panel cutting is desired and then the edge-shaping head A may be substituted for the cutting head when panel edging, i.e. edge-offsetting as aforesaid, is desired.

While the hammer and anvil working-face profile shown in FIGS. 3 and 4 has been found to be satisfactory for an edge-offsetting tool according to the invention for use in the automobile body repair field, obviously the invention is not limited to this one profile. Rather, many other hammer and anvil working-face profiles are possible and, as illustrative, reference is had to FIG. 10 depicting modified hammer and anvil working faces 58, 68 characterized by a profile which is such as to form a round bottom or semi-circular groove g in the edge zone of the workpiece running parallel to the workpiece edge. Such a groove may be filled with the solder or the like used in making the joint between the so grooved edge panel and the adjacent panel.

Regardless of their profile, it is contemplated that the hammer and anvil working faces will be provided directly on and thus integral with their respective hammer and anvil parts 30, 46, respectively. However, said working faces may be formed on parts separable from and attachable to said hammer and anvil parts without departing from the scope and intent of the invention. In the latter case, change of working-face profile may be had simply by removing the corresponding profile-defining parts for one profile and substituting similar parts having a different profile.

While the description has so far centered about the concept of forming an offset edge on only one of two metal sheets or panels to be joined along adjacent edges, as in FIG. 9, it is of course possible to use the edge-shaping tool according to the present invention to form opposite, i.e. left- and right-hand, offsets in said adjacent edges, which offsets are thus capable of nesting one within the other. The desirable surface-flush or -blended relationship of panels may then be achieved by filling the depression remaining upon nesting of said offsets with a plastic filler or like substance applied in manner as to blend the surfaces of the continguous panels one with the other.

Briefly reviewing the advantages of a tool according to the invention, said tool may be held solely by the handgrip portion of the pneumatic hammer or gun H in a working position in which it substantially overlies the edge portion of the metal sheet or panel to be offset or otherwise shaped and then simply moved forwardly along said edge. Such represents a manner of holding and a mode of operating the tool which is made possible only by forming the working surfaces of hammer and anvil so that they incline forwardly-downwardly with respect to the longitudinal axis of the tool. This positioning of tool as it forms or shapes the edge of a metal sheet or panel is of particular utility in automobile repair work wherein the edge(s) of the good, usually fixed-in-place panel with which a repair panel is to be associated is in most cases fully accessible from its front face but is not so accessible from the side or edge thereof, thus ruling out the use of a tool which must be held from a side of the panel edge being formed.

A sheet- or panel-edge shaping tool of the invention is also noteworthy in that the forward-downward slope or inclination of the hammer and anvil working surfaces makes possible the holding of the pneumatic hammer by which it is powered at an angle to the workpiece which is less fatiguing to the operator than if the gun or hammer were required to be held vertically with respect to the workpieces, for example, since in the latter position the operator is usually required to supply some substantial lifting effort in maintaining the gun upright. Another advantageous feature is that the tool is capable of being placed in working position on the panel or sheet whose edge is to be shaped simply by "hooking" it sidewardly over said edge, as permitted by the fact that the tool has one side open for the entry of said edge to be shaped, and to a depth such that the edge proper will abut the inside flat-wall surface of the connector arm 44, which surface thereafter serves as a means for guiding the tool in its movement along said panel edge.

As many changes could be made in carrying out the above constructions without departing from the scope of the invention, it is intended that all matter contained in the above description or shown in the accompanying drawings shall be interpreted as illustrative and not in a limiting sense.

It is claimed:

1. A metal sheet or panel edge-shaping tool adapted for attachment to and operation by a percussive-type power hammer comprising, in combination, a barrel having means at its relatively rearward end for attaching same to the power hammer, a plunger reciprocable in the bore of the barrel and being driven on its working stroke by the percussive element of said power hammer, and an edge-shaping head affixed to and extending forwardly from the forward end of the barrel and including cooperatively related hammer and anvil elements and a rigid anvil-carrying arm extending forwardly from said barrel to said anvil and being displaced laterally of said hammer and thereby of the path of motion thereof, said hammer element having a rear-end shank portion removably affixed to said plunger and a forwardly disposed working end and said anvil element extending transversely across the path of reciprocatory motion of the working end of the hammer element so as to be operatively struck thereby, said hammer and anvil elements having opposed working faces which are inclined forwardly-downwardly with respect to the longitudinal axis of the tool, said anvil-carrying arm having a flat inner surface engageable by the edge proper of a sheet or panel inserted between the hammer and anvil.

2. A tool according to claim 1, wherein the edge-shaping head is separable from and removably secured to the forward end of the barrel.

3. A tool according to claim 1, wherein the edge-shaping head is separate from and removably secured to the forward end of the barrel and comprises a rearward attaching collar witih which said anvil and anvil-carrying arm are integral.

4. A tool according to claim 1, wherein said opposed working surfaces are complementally stepped whereby the tool is adapted to form an offset extending along the edge portion of the metal sheet or panel being worked on by said tool.

5. A tool according to claim 1, wherein said opposed working surfaces are complementally ribbed and grooved, thereby to form a groove extending along the edge portion of the metal sheet or panel being worked on.

6. A metal sheet or panel edge-offsetting tool adapted for attachment to and operation by a percussive-type power hammer comprising, in combination, a barrel having means at its relatively rearward end for attaching same to the power hammer, a plunger reciprocable in the bore of the barrel and being driven on its working stroke by the percussive element of said power hammer, an edge-offsetting head affixed to and extending forwardly from the forward end of the barrel and including cooperatively related hammer and anvil elements, said hammer element having a rear-end shank portion removably affixed to said plunger and a forwardly disposed working end of said anvil element extending transversely across the path of reciprocatory motion of the working end of the hammer element so as to be operatively struck thereby, the working end of said hammer element having a working face which is inclined forwardly-downwardly with respect to the longitudinal axis of the tool and said anvil having similarly forward-downward inclination whereby its working face is disposed parallel to the working face of the hammer element, and a single means for fixedly securing the anvil element to the forward end of the barrel, for determining the depth of insertion of the panel or sheet edge portion between the working faces of said hammer and anvil elements, and for guiding the tool as a whole along the edge proper of said panel or sheet.

References Cited by the Examiner
UNITED STATES PATENTS

| | | |
|---|---|---|
| 624,435 | 5/89 | Fielding. |
| 1,118,871 | 11/14 | Leonard. |
| 1,258,206 | 3/18 | Fetcher. |
| 2,163,715 | 6/39 | Stull. |
| 2,263,952 | 11/41 | Mercorelli _____ 81—15 |
| 2,720,802 | 10/55 | Geller _____ 81—15 |
| 3,056,201 | 10/62 | Chandler _____ 30—277 |

WILLIAM FELDMAN, *Primary Examiner.*